United States Patent
Russell et al.

(10) Patent No.: US 6,840,258 B1
(45) Date of Patent: Jan. 11, 2005

(54) DYNAMICALLY-MONITORED DOUBLE VALVE WITH ANTI-TIEDOWN FEATURE

(75) Inventors: Neil E. Russell, Bloomfield Hills, MI (US); Joseph E. Foster, Sterling Heights, MI (US)

(73) Assignee: Ross Operating Valve Company, Troy, MI (US)

( * ) Notice: Subject to any disclaimer, the term of this patent is extended or adjusted under 35 U.S.C. 154(b) by 0 days.

(21) Appl. No.: 10/660,992

(22) Filed: Sep. 12, 2003

(51) Int. Cl.[7] ............................................. F15B 20/00
(52) U.S. Cl. ...................... 137/14; 91/424; 137/596.16
(58) Field of Search ............................ 91/424; 137/14, 137/596.16

(56) References Cited

U.S. PATENT DOCUMENTS

| | | |
|---|---|---|
| 4,542,767 A | 9/1985 | Thornton et al. |
| 5,796,571 A | 8/1998 | Wetzel et al. |
| 5,912,795 A | 6/1999 | Wetzel et al. |
| 5,927,324 A | 7/1999 | Russell et al. |
| 6,478,049 B2 | 11/2002 | Bento et al. |

Primary Examiner—Gerald A. Michalsky
(74) Attorney, Agent, or Firm—Mark L. Mollon (57) ABSTRACT

A double valve is reset when a source of pressurized fluid is connected to a reset port. When the source of pressurized fluid is removed from the reset port, a first reset piston is retracted so that a second pilot chamber receives pressurized fluid while a first pilot chamber continues to be vented. A second reset piston is retracted after a predetermined delay time following retraction of the first reset piston, the predetermined delay time being sufficient to allow the second pilot chamber to become substantially pressurized. If a second pilot valve is actuated when the second reset piston is retracted, then the pressurized fluid in the second pilot chamber drives the second movable valve unit out of a deactuated position during a time that pressurized fluid in the first pilot chamber is insufficient to drive the first movable valve unit out of a deactuated position.

12 Claims, 6 Drawing Sheets

DYNAMICALLY-MONITORED DOUBLE VALVE WITH ANTI-TIEDOWN FEATURE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to control valves, and, more specifically, to resetting a double valve for controlling a single flow of pressurized fluid in response to simultaneous activation of a pair of control switches.

Machine tools of various types operate through a valving system, which interacts with a pneumatically-controlled clutch and/or brake assembly. For safety reasons, the control valves that are used to operate these machine tools require the operator to activate two separate control switches substantially simultaneously to ensure that an operator's hands are away from the moving components of the machine tool when an operating cycle is initiated. Typically, an electronic circuit responsive to the two control switches generates a pilot control signal applied to the pilot valves for switching the main fluid circuit of the valve to control delivery of compressed air (or other fluid) to the machine tool to perform its operating cycle.

Double valves operating in parallel in one valve body have been developed to ensure that a repeat or overrun of a machine tool operating cycle cannot be caused by malfunction of a single valve unit (e.g., a valve becoming stuck in an actuated position). Thus, if one valve unit fails to deactuate at the proper time, the double valve assumes a configuration that diverts the source of compressed air from the machine tool. A double valve is shown, for example, in commonly assigned U.S. Pat. No. 6,478,049 to Bento et al, which is incorporated herein by reference for all purposes.

In addition to providing protection against the repeat or overrun of the machine tool, it is desirable to monitor the double valve for a faulted valve unit and to prevent a new operating cycle of the machine tool from being initiated. Thus, prior art systems have caused the double valve to assume a lock-out configuration when a single valve unit is in a faulted condition so that the double valve cannot again be actuated until it has been intentionally reset to clear the faulted condition.

More specifically, a double valve assembly includes two electromagnetically-controlled pilot valves. Typically, the pilot valves are normally closed. The double valve assembly includes two movable valve units, each with a respective exhaust poppet between the outlet port and the exhaust port of the double valve and a respective inlet poppet between the outlet port and the inlet port of the double valve. When the pilot valves are normally closed, then the exhaust poppets are normally open and the inlet poppets are normally closed. Each of the pilot valves is moved to an actuated position in response to an electrical control signal from a respective operator-controlled switch, which typically causes the exhaust poppets to close and the inlet poppets to open. Any time that 1) a valve unit fails to deactuate properly, 2) a valve unit fails to actuate properly, or 3) the pilot valves are actuated or deactuated non-simultaneously, then at least one valve unit becomes locked in a faulted position where its exhaust poppet cannot be closed (thereby preventing the outlet from becoming pressurized).

In a typical reset operation, one or more faulted movable valve units are returned to their deactuated positions by the application of pressure from a source via a 2- or 3-way control valve to a reset port. The pressure causes a reset piston to extend in a manner that drives or pushes a faulted valve unit out of the faulted position so that the control valve can be actuated to start an operating cycle of the machine tool. If a faulted valve unit is present, then it is desirable for a machine operator to service the control valve to repair the valve unit. However, operators may sometimes attempt to maintain the reset function continuously in order to continue machine tool operations without repairing a faulted valve unit by "tying down" the reset control valve. It is desirable to provide an anti-tiedown function in the design of the double valve so that the tying down of the reset valve cannot prevent the control valve from locking out in response to a faulted valve unit.

Prior anti-tiedown mechanisms have required added components that were relatively complicated and that added significant cost to the valves. Furthermore, in some valve configurations, it has been possible to tie down the main pilot switches and operate a machine tool using the reset control as a single control point (thereby defeating the mechanism for requiring simultaneous activation of the two manual switches). Prior anti-tiedown mechanisms have not prevented this type of operation of the control valve.

SUMMARY OF THE INVENTION

The present invention provides a double valve having a reset mechanism with a low part count that can be easily integrated into the valve and prevents using the reset function to actuate the valve while tying down the main pilot switches.

In one aspect of the invention, a method is provided for resetting a double valve. A source of pressurized fluid is connected to a reset port. First and second reset pistons are actuated in response to the pressurized fluid to reset first and second movable valve units of the double valve, respectively. First and second pilot chambers are vented when the first and second reset pistons are actuated, the first and second pilot chambers corresponding to first and second pilot valves for actuating the first and second movable valve units, respectively. The venting prevents the first and second movable valve units from moving out of a deactuated position, respectively. The source of pressurized fluid is removed from the reset port. The first reset piston is retracted so that the second pilot chamber receives pressurized fluid while the first pilot chamber continues to be vented. The second reset piston is retracted after a predetermined delay time following retraction of the first reset piston, the predetermined delay time being sufficient to allow the second pilot chamber to become substantially pressurized. If the second pilot valve is actuated when the second reset piston is retracted, then the pressurized fluid in the second pilot chamber drives the second movable valve unit out of a deactuated position during a time that pressurized fluid in the first pilot chamber is insufficient to drive the first movable valve unit out of a deactuated position.

DETAILED DESCRIPTION OF PREFERRED EMBODIMENTS

Figure 1:
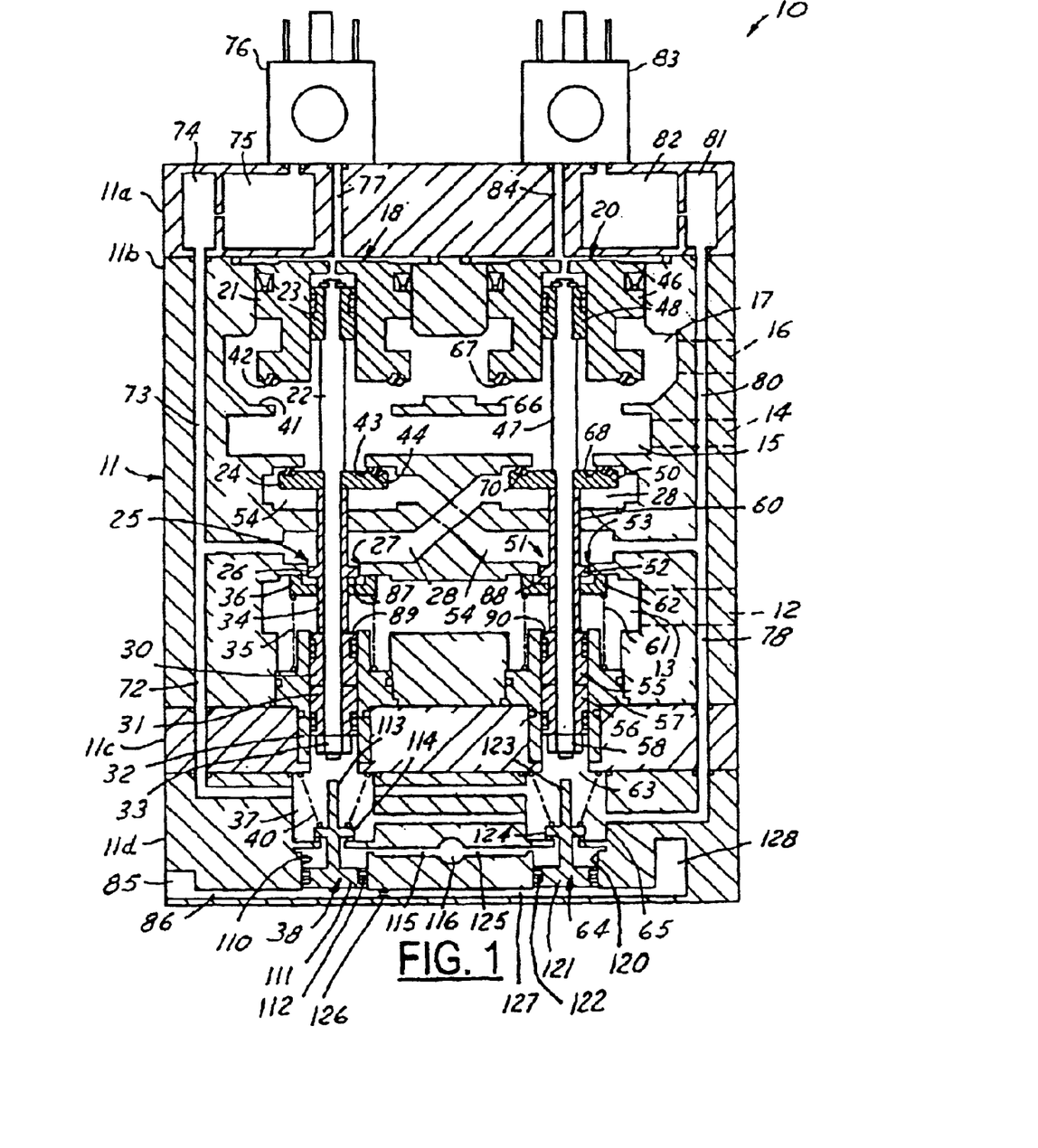
FIG. 1 is a cross-sectional view of a double valve according to a first embodiment of the present invention in its normal deactuated position.

Referring now to FIG. 1, a control valve system in the form of a double valve 10 includes a housing 11 having an inlet port 12 leading to an inlet chamber 13, an outlet port 14 leading to an outlet chamber 15, and an exhaust port 16 leading to an exhaust chamber 17. Housing 11 may include separate blocks 11a–11d which may be clamped or bolted together.

Chambers 13, 15, and 17 are joined by various passages to create elongated bores for receiving a first movable valve unit 18 and a second movable valve unit 20. First movable valve unit 18 includes an exhaust piston/poppet 21 slidably received at one end of a stem 22 via a piston 23. First movable valve unit 18 also includes an inlet poppet 24 and a flow restrictor 25. A disk-shaped shoulder 26 extends from a spacer 34 that is fixed to stem 22. Shoulder 26 is slidably received in a passage 27 forming flow restrictor 25 so that pressurized fluid from inlet chamber 13 flows at a reduced rate into a first crossover chamber 28 when shoulder 26 is present in passage 27.

The lower end of stem 22 receives pistons 30 and 31 which are retained by a retainer nut 33 threaded to one end of stem 22. Pistons 30 and 31 are slidably received in a bushing 32 which is rigidly retained within housing 11.

A spring stop 36 is slidably received on spacer 34 and is urged in an upward direction by a return spring 35. Beneath movable valve unit 18, a return chamber 37 is formed which receives part of a reset piston 38 and a piston return spring 40.

First movable valve unit 18 is shown in FIG. 1 in its deactuated position wherein outlet port 14 is open to exhaust port 16 and closed to inlet port 12. Thus, exhaust piston/poppet 21 is in its upward, deactuated position wherein an exhaust seal 42 is spaced away from an exhaust seat 41. At the same time, an inlet seal 44 of inlet poppet 24 is disposed against an inlet seat 43.

Second movable valve unit 20 includes an exhaust piston/poppet 46 slidably received at one end of a stem 47 via a piston 48. Second movable valve unit 20 also includes an inlet poppet 50 and a flow restrictor 51. A disk-shaped shoulder 52 extends from a spacer 60 that is fixed to stem 47. Shoulder 52 is slidably received in a passage 53 forming flow restrictor 51 so that pressurized fluid from inlet chamber 13 flows at a reduced rate into a second crossover chamber 54 when shoulder 52 is present in passage 53.

The lower end of stem 47 receives pistons 55 and 56 which are retained by a retainer nut 58 threaded to one end of stem 47. Pistons 55 and 56 are slidably received in a bushing 57 which is rigidly retained within housing 11.

A spring stop 62 is slidably received on spacer 60 and is urged in an upward direction by a return spring 61. Beneath movable valve unit 20, a return chamber 63 is formed which receives part of a reset piston 64 and a piston return spring 65.

Second movable valve unit 20 is shown in FIG. 1 in its deactuated position wherein outlet port 14 is open to exhaust port 16 and closed to inlet port 12. Thus, exhaust piston/poppet 46 is in its upward, deactuated position wherein an exhaust seal 67 is spaced away from an exhaust seat 66. At the same time, an inlet seal 70 of inlet poppet 50 is disposed against an inlet seat 68.

A fluid passage 72 provides fluid communication between first crossover chamber 28 and return chamber 63 of second movable valve unit 20. A fluid passage 73 provides fluid communication from first crossover chamber 28 to timing chambers 74 and 75 for providing pressurized fluid to an input of a first pilot valve 76. A passage 77 is coupled between the output of first pilot valve 76 and the upper surface of exhaust piston/poppet 21.

A fluid passage 78 provides fluid communication between second crossover chamber 54 and return chamber 37 of first movable valve unit 18. A fluid passage 80 provides fluid communication from second crossover chamber 54 to timing chambers 81 and 82 for providing pressurized fluid to an input of a second pilot valve 83. A passage 84 is coupled between the output of second pilot valve 83 and the upper surface of exhaust piston/poppet 46.

When units 18 and 20 are in their deactuated positions and no pressure is being applied in any portions of the double valve, then valve units 18 and 20 are held in their upper, deactuated positions by friction (e.g., between pistons 30 and 31 and bushing 32). Preferably, the amount of friction provided is sufficient to maintain the movable valve units in their current positions against the force of gravity regardless of what orientation the valve body is placed.

When inlet pressure is first applied to inlet port 12, the movable valve units remain at their deactuated positions as follows. The pressure in inlet chamber 13 immediately reflects the increased pressure at inlet port 12. The surfaces of first movable valve unit 18 that are open to inlet chamber 13 include a first side 87 of shoulder 26 and an upper surface 89 of piston 30. These surfaces are provided with equal areas such that inlet pressure against the surfaces creates an upward force against surface 87 which is substantially exactly counterbalanced by a downward force against surface 89. Similarly, a surface 88 of shoulder 52 has an area substantially equal to a surface 90 of piston 55. Thus, a net force of substantially zero acts upon each of the movable valve units in response to the build up of pressure in inlet chamber 13.

Due to the imperfect seals of flow restrictors 25 and 51, pressure begins to build up in crossover chambers 28 and 54. As pressure builds up in the crossover chambers, the resulting pressure acts upon inlet poppets 24 and 50 to force them against their respective seats 43 and 68, respectively. The increasing pressure is also communicated to return chambers 37 and 63, which also creates an upward force to seat the inlet poppets. Pressure from the crossover chambers is also communicated to the timing chambers of pilot valves 76 and 83. After a short delay, pressure in the crossover chambers, return chambers, and timing chambers equalize with the pressure in inlet chamber 13. Unlike in the double valve shown in prior U.S. Pat. No. 6,478,049, pressurized fluid is always supplied to crossover chambers 28 and 54 and is allowed to build up to equal the inlet pressure whenever the double valve is not in a faulted state (i.e., there is no fluid path between the inlet and the exhaust).

Figure 2:
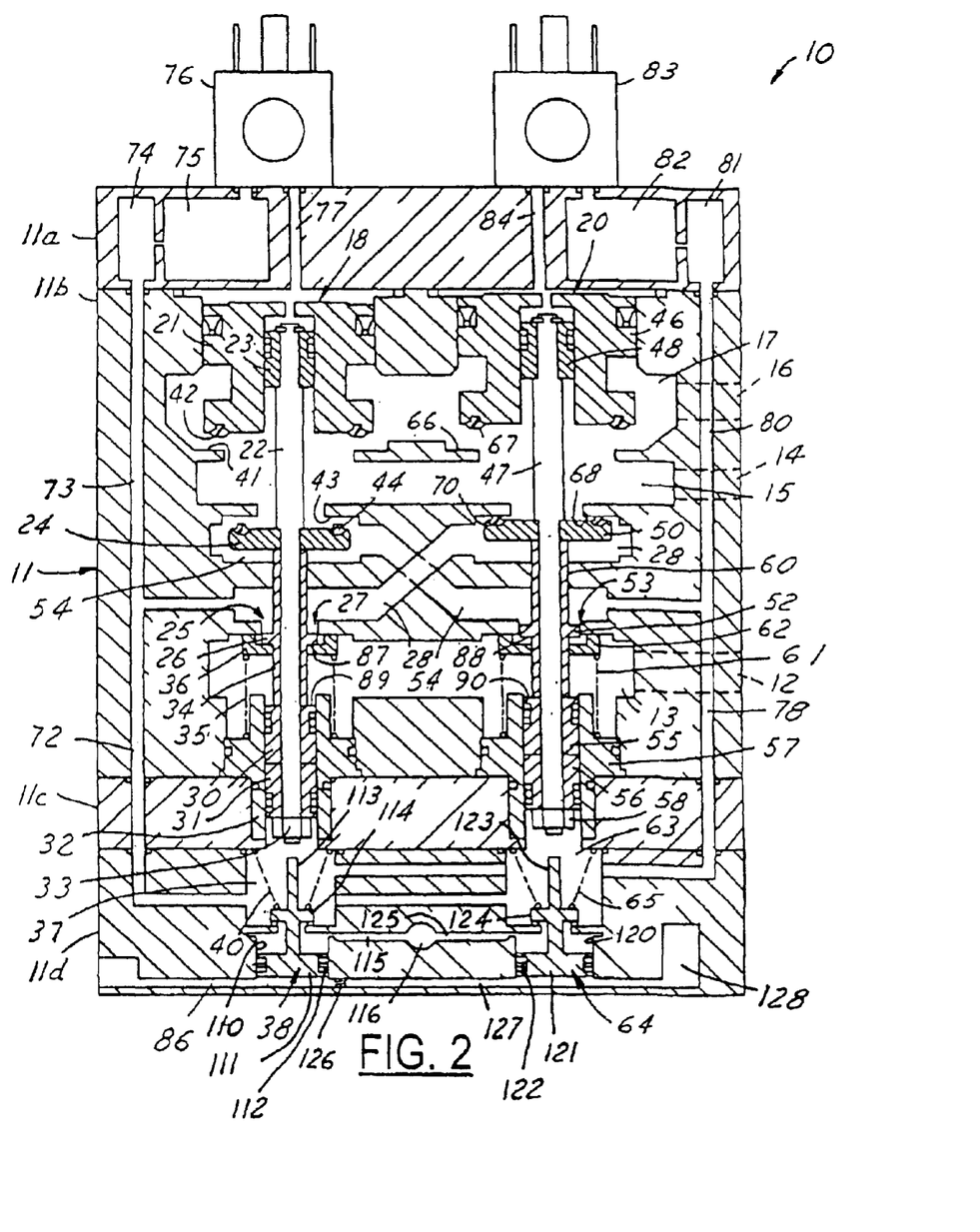
FIG. 2 is a cross-sectional view of double valve of FIG. 1 with a valve unit in a faulted position.

Valve 10 is shown in FIG. 2 having one movable valve unit in a faulted condition. The faulted state results when first movable valve unit 18 has failed to return to its deactuated position after turning off of pilot valve 76, for example. First movable valve unit 18 is shown at its intermediate position wherein both exhaust piston/poppet 21 and inlet poppet 24 are in an unseated condition. If movable valve unit 18 is in an actuated (i.e., fully downward) position when it first becomes faulted, return spring 35 will attempt to move first movable valve unit 18 to the intermediate position. Spring stop 36 prevents inlet poppet 24 from being moved to its closed position. With inlet poppet 24 open, second crossover chamber 54 is coupled to exhaust 16 via one or both of the exhaust valves. With second crossover chamber 54 exhausted, return chamber 37 is exhausted so that no return force can be generated on first movable valve unit 18. Timing chambers 81 and 82 are also exhausted so that double valve 10 is in a locked out condition wherein second movable valve unit 20 cannot be actuated by second pilot valve 83. Since inlet poppet 50 is closed, pressure builds in first crossover chamber 28 even though the other movable valve unit 18 is faulted. Crossover chamber 28 provides pressure to return chamber 63 and to timing chambers 74 and 75. Thus, when pilot valves 76 and 83 are actuated, faulted valve unit 18 receives full pressure at the top of exhaust piston/poppet 21 and can move into its fully actuated position. However, since exhaust piston/poppet 46 is open while inlet poppet is open, significant pressure cannot build in crossover chamber 54. Consequently, pilot valve 83 is not able to provide sufficient pressure to move second movable valve unit 20 from its deactuated position. Thus, double valve 10 remains in a locked out position at least until both movable valve units are reset by reset pistons 38 and 64.

In the event that inlet pressure is turned off while a movable valve unit is in its fully actuated position, then the valve unit is urged into the intermediate position by the corresponding return spring. The return spring cannot move the corresponding movable valve unit beyond the intermediate position due to the corresponding spring stop. The movable valve unit is prevented from moving all the way to its deactuated position by friction and/or gravity depending upon the orientation of the double valve. If inlet pressure is restored, pressure from the flow restrictor corresponding to the non-faulted movable valve unit is supplied into a crossover chamber which is open to exhaust through the faulted inlet poppet and at least the exhaust piston/poppet of the non-faulted unit. Since full pressure builds up in the other crossover chamber (i.e., the crossover chamber fed by the flow restrictor of the faulted valve unit), a downward pressure against the flow restrictor from within the crossover chamber latches the faulted movable valve unit in the intermediate position against the return spring.

The resetting of valve 10 will now be described. The reset mechanism is shown in its normal, deactuated state in FIG. 1. A reset port 85 communicates with a reset passage 86 for providing reset pressure to reset pistons 38 and 64 which can be driven upward to put first and second movable valve units 18 and 20 in their normal deactuated positions. First reset piston 38 has a lower piston member 111 slidably retained in a first reset chamber 110. An annular seal 112 on lower piston member 111 engages the wall of first reset chamber 110. Reset piston 38 also includes a push rod 113 and a first reset poppet 114. The upper end of first reset chamber 110 communicates with a vent 116 via a passage 115.

Second reset piston 64 has a lower piston member 121 slidably retained in a second reset chamber 120. An annular seal 122 on lower piston member 121 engages the wall of second reset chamber 120. Reset piston 64 also includes a push rod 123 and a second reset poppet 124. The upper end of second reset chamber 120 communicates with vent 116 via a passage 125.

Reset passage 86 communicates directly with the lower end of first reset chamber 110. Reset passage 86 is coupled to a passage 127 via a flow restrictor 126, such as an orifice. Passage 127 communicates with the lower end of second reset chamber 120 and with an optional reset timing chamber 128.

Figure 3:
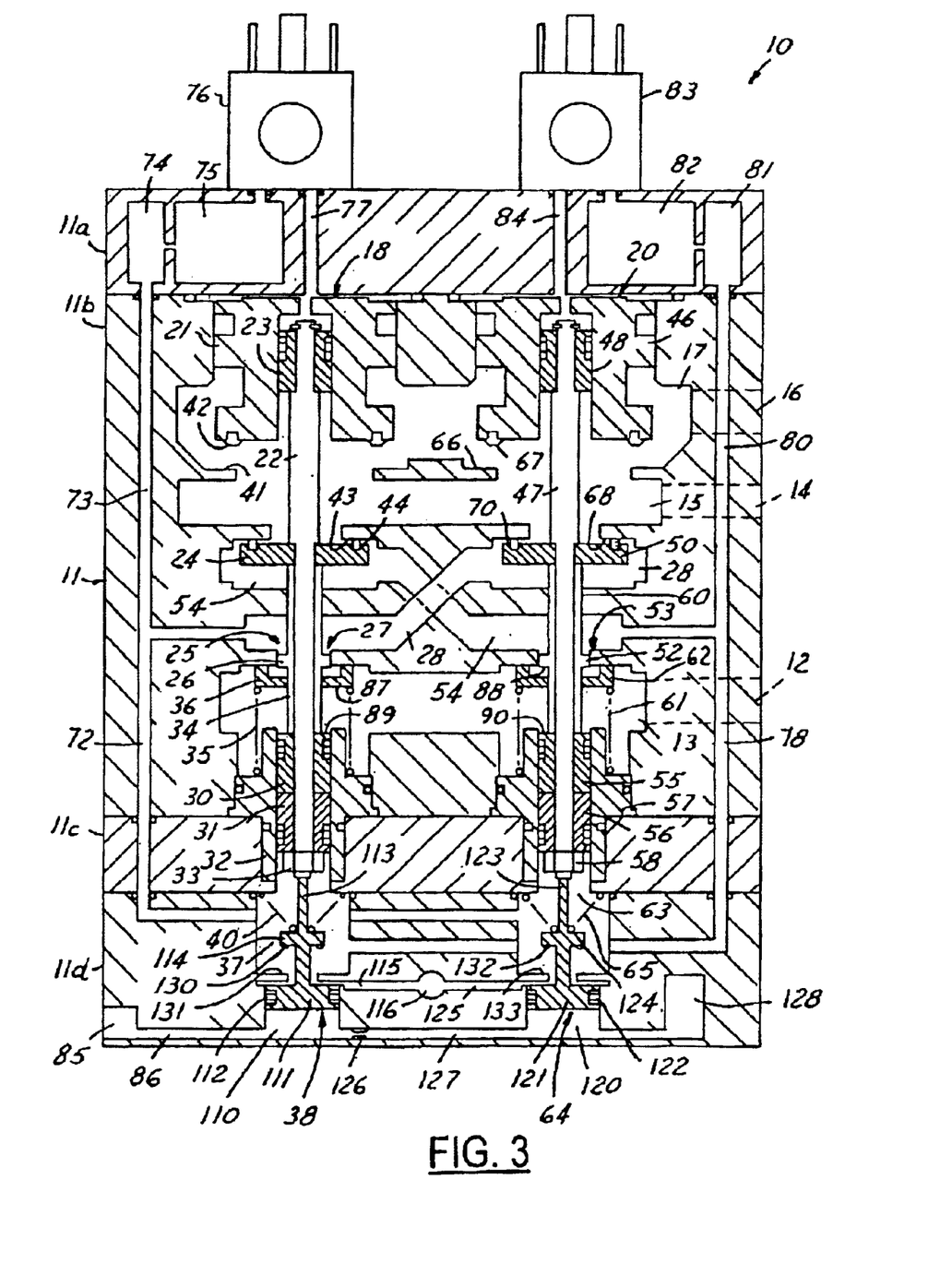
FIG. 3 is a cross-sectional view of double valve of FIG. 1 with the reset pistons extended in response to pressure at the reset port.

FIG. 3 shows control valve 10 with both reset pistons fully actuated by application of pressurized fluid to reset port 85. The pressurized fluid flows from reset port 85 through passage 86 to first reset chamber 110, driving lower piston member 111 upward. Push rod 113 engages the lower end of stem 22 and drives first movable valve unit 18 upward to is deactuated position. Simultaneously, first reset poppet 114 moves off seat (i.e., reset valve seal 130 moves off of a reset valve seat 131). Thus, return chamber 37 communicates with vent 116 via passage 115. Since vent 116 is exhausted to atmosphere, second pilot timing chambers 81 and 82 are also exhausted. This prevents second valve unit 20 from being actuated during a reset operation.

Pressurized fluid from passage 86 also flows through restrictor 126 to pressurize second reset chamber 120 at a slower rate than first reset chamber 10. Reset timing chamber 128 may be used to provide an increased difference in the time it takes to actuate (or deactuate) second reset piston 64. Nevertheless, after a sufficient amount of fluid has passed through restrictor 126, second reset piston 64 moves to its fully actuated position as shown in FIG. 3 in order to reset second movable valve unit 20. The unseating of second reset poppet 124 (i.e., reset valve seal 132 moving off seat 133) results in first pilot timing chambers 74 and 75 to be exhausted via passages 73 and 72, return chamber 63, and passage 125, thereby preventing first valve unit 18 from being actuated during a reset operation.

Figure 4:
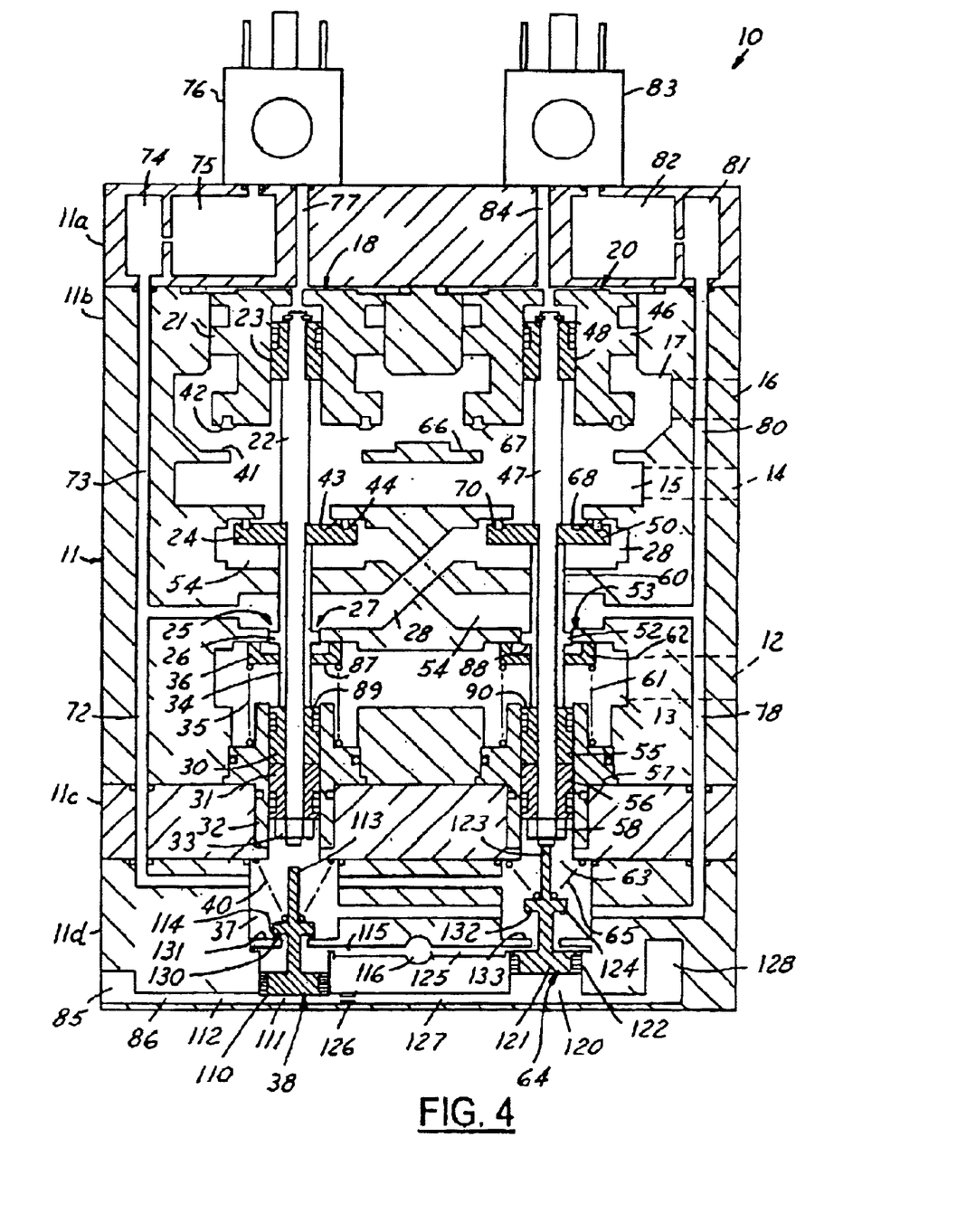
FIG. 4 is a cross-sectional view of double valve of FIG. 1 just after pressure has been removed from the reset port during a reset operation.

After sufficient time has passed to allow both valve units to be reset, the pressure is removed from reset port 85. Provided that reset port 85 is adequately exhausted, pressure drops in first reset chamber 110 very quickly so that it moves back from its extended position to its retracted position by action of piston return spring 40 as shown in FIG. 4. The closing of first reset poppet 114 isolates return chamber 37 from vent 116. If inlet pressure is present, pressure building in crossover chamber 54 eventually pressurizes return chamber 37 and second pilot timing chambers 81 and 82. Pressure in crossover chamber 54 also forces inlet poppet 24 upward.

After first reset piston 38 deactuates, second reset piston 64 remains in an actuated position due to the retention of pressure by flow restrictor 126. Thus, while pressure is built up in second pilot timing chambers 81 and 82, first pilot timing chambers 74 and 75 continue to be exhausted through second reset poppet 124. The time delay for fully deactuating second reset piston 64 depends on the sizes of flow restrictor 126, second reset chamber 120, and reset timing chamber 128. The delay is made long enough to allow second pilot timing chambers 81 and 82 to be substantially pressurized before closing of second reset poppet 124 (and before significant pressure can be built up in first pilot timing chambers 74 and 75). Therefore, when second reset piston 64 fully deactuates and if pilot valve 83 is turned on, then second movable valve unit 20 is moved out of its deactuated position and into its actuated position, thereby exhausting crossover chamber 28, timing chambers 74 and 75, and return chamber 63. Consequently, the valve is locked out, thereby preventing the reset function from being used to operate the valve with the pilot valves actuated.

Figure 5:
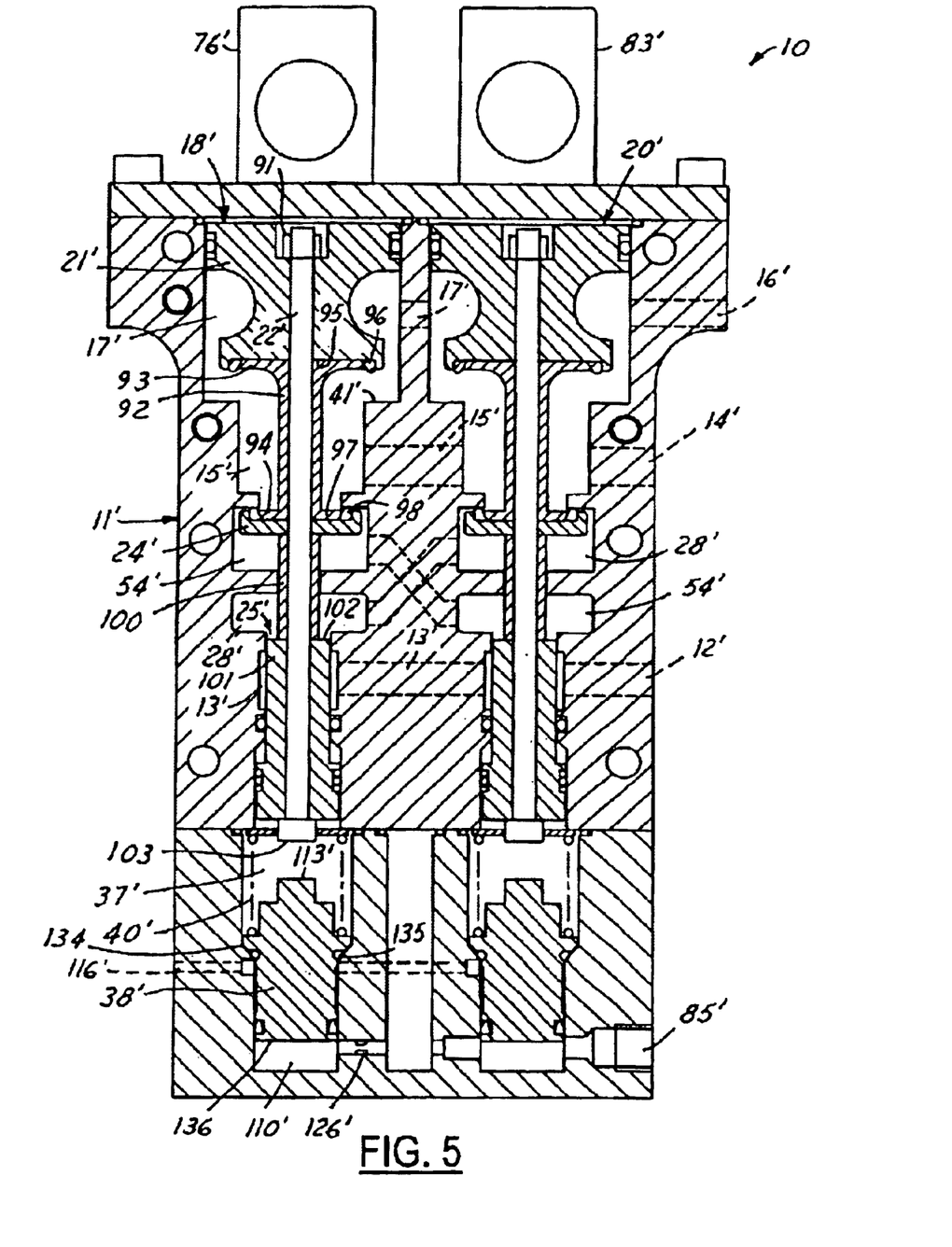
FIG. 5 is a cross-sectional view of double valve according to a second embodiment of the present invention in its normal deactuated position.

FIG. 5 shows an alternative embodiment of a double valve 10', which functions in essentially the same manner as the embodiment shown in FIGS. 1–4. Corresponding parts in FIG. 5 are designated using the same reference numbers with an added prime. Housing 11' includes a first movable valve unit 18' and a second movable valve unit 20'. Since the units are identical, only movable valve unit 18' will be described in detail.

A valve stem 22' has an exhaust piston/poppet 21' fixedly mounted at one end by a retaining nut 91. A spacer 92 has disc portions 93 and 94 at each axial end. Exhaust piston/poppet 21' includes a cavity 95, which is bowl shaped and receives disc portion 93 and an o-ring 96. O-ring 96 forms a face seal with exhaust seat 41' in the manner described in co-pending application Ser. No. 10/631,191, filed Jul. 31, 2003, incorporated herein by reference. Likewise, inlet poppet 24' has a cavity 97 for receiving disc shaped portion 94 and an o-ring 98.

Also mounted to stem 22' are a spacer 100 and a piston 101. A boss 103 at the bottom end of stem 22' clamps the poppets, spacers, and piston in a fixed relationship on stem 22'. Piston 101 is shaped to provide a flow restrictor 25' between inlet chamber 13' and crossover chamber 28'. Piston 101 has a constant diameter throughout inlet chamber 13' so that it has no surfaces for exerting force in an axial direction on movable valve unit 18'. However, a top surface 102 is exposed to crossover chamber 28' for generating a downward latching force when in the faulted state as described earlier.

A first reset chamber 110' receives first reset piston 38' having a push rod extension 113'. Chamber 110' receives reset pressure at reset port 85' via a flow restrictor 126'. A first reset poppet 134 includes an o-ring 135. When poppet 134 is on-seat as shown in FIG. 5, first return chamber 37' is isolated from vent 116'. When piston 38' is actuated, poppet 134 is opened and an exhaust path is created for return chamber 37' and the opposite pilot timing chambers (not shown).

First reset piston 38' has a bottom surface area 136 exposed to reset chamber 110' which is less than the opposing surface area on the top of piston 38' exposed to return chamber 37'. Therefore, the valve in FIG. 5 cannot be reset unless the reset pressure exceeds the pressure that is present in the return chambers.

Figure 6:
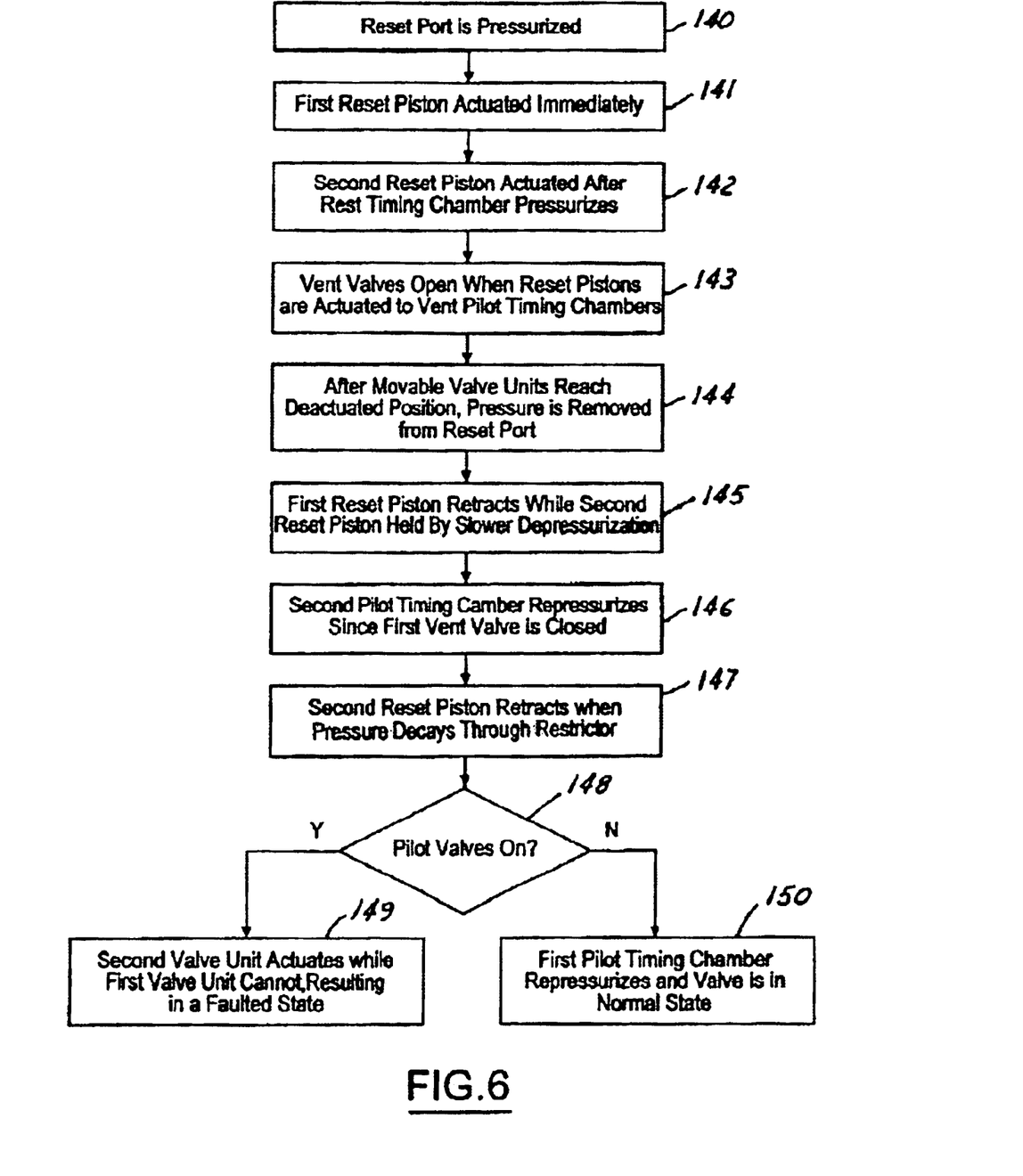
FIG. 6 is a flowchart showing a preferred method of the present invention.

A preferred method of operation of the present invention is shown in FIG. 6. In step 140, the reset port is pressurized (e.g., a three-way valve is actuated to couple the reset port to a source of compressed air). In step 141, the first reset piston is actuated substantially immediately since it is directly coupled to the reset port and no significant volume must first be pressurized. The second reset piston becomes actuated in step 142 after sufficient pressurized fluid has flowed through the flow restrictor and any supplemental reset timing chamber is pressurized.

In step 143, when the respective reset pistons are actuated, they open respective vent valves to vent the opposite pilot timing chambers. After the deactuated positions of the movable valve units are achieved, pressure is removed from the reset port in step 144. In step 145, the first reset piston retracts while the second reset piston is held in its extended, actuated position by the slower depressurization of the second reset chamber. In step 146, the second pilot timing chamber(s) repressurize since the first vent valve has closed (assuming inlet pressure is present). When sufficient pressure has decayed to the reset port through the flow restrictor, the second reset piston retracts in step 147.

Successful reset of the valve units in the present invention depends on the pilot valves being off. If pilot valves are on in step 148, then the second valve unit actuates (i.e., moves out of the deactuated position) while the first valve unit cannot, which results in a faulted state of the valve. If the pilot valves are off in step 148, then the first pilot timing chamber(s) repressurizes in step 150 and the valve is in its normal, ready-to-run state.

What is claimed is:

1. A method of resetting a double valve comprising the steps of:

connecting a source of pressurized fluid to a reset port;

actuating first and second reset pistons in response to said pressurized fluid to reset first and second movable valve units of said double valve, respectively;

venting first and second pilot chambers when said first and second reset pistons are actuated, said first and second pilot chambers corresponding to first and second pilot valves for actuating said first and second movable valve units, respectively, wherein said venting prevents said first and second movable valve units from moving out of a deactuated position, respectively;

removing said source of pressurized fluid from said reset port;

retracting said first reset piston so that said second pilot chamber receives pressurized fluid while said first pilot chamber continues to be vented;

retracting said second reset piston after a predetermined delay time following retraction of said first reset piston, said predetermined delay time being sufficient to allow said second pilot chamber to become substantially pressurized; and if said second pilot valve is actuated when said second reset piston is retracted, then said pressurized fluid in said second pilot chamber driving said second movable valve unit out of a deactuated position during a time that pressurized fluid in said first pilot chamber is insufficient to drive said first movable valve unit out of a deactuated position.

2. The method of claim 1 wherein, if said second pilot valve is not actuated when said second reset piston is retracted, then said first pilot chamber becomes substantially pressurized, thereby completing said resetting of said double valve.

3. A control valve system comprising:

a housing defining an inlet, an outlet, an exhaust, and a reset port, said inlet and said reset port being adapted to receive pressurized fluid;

a first movable valve unit including a first exhaust poppet and a first inlet poppet, wherein said first exhaust poppet is movable between an open position for coupling said outlet to said exhaust and a closed position for isolating said outlet from said exhaust, wherein said first inlet poppet is movable between an open position for coupling said outlet to said inlet and a closed position for isolating said outlet from said inlet, wherein said first movable valve unit is movable to an actuated position, a deactuated position, and an intermediate position, wherein said actuated position comprises said first inlet poppet being in its open position and said first exhaust poppet being in its closed position, wherein said deactuated position comprises said first inlet poppet being in its closed position and said first exhaust poppet being in its open position, and wherein said intermediate position comprises said first inlet poppet and said first exhaust poppet both being at least partially open;

a second movable valve unit including a second exhaust poppet and a second inlet poppet, wherein said second exhaust poppet is movable between an open position for coupling said outlet to said exhaust and a closed position for isolating said outlet from said exhaust, wherein said second inlet poppet is movable between an open position for coupling said outlet to said inlet and a closed position for isolating said outlet from said inlet, wherein said second movable valve unit is movable to an actuated position, a deactuated position, and an intermediate position, wherein said actuated position comprises said second inlet poppet being in its open position and said second exhaust poppet being in its closed position, wherein said deactuated position comprises said second inlet poppet being in its closed position and said second exhaust poppet being in its open position, and wherein said intermediate position comprises said second inlet poppet and said second exhaust poppet both being at least partially open;

first and second pilot valves disposed at one end of said first and second movable valve units, respectively, for selectably urging said first and second movable valve units to said respective actuated positions;

first and second pilot timing chambers for storing pressurized fluid to be provided to said first and second pilot valves, respectively;

a flow restrictor coupled to said reset port;

first and second reset pistons for being extended to drive said first and second movable valve units to their deactuated positions, respectively, in response to pressurized fluid from said reset port, wherein said second reset piston communicates with said reset port via said flow restrictor, and wherein said first reset piston communicates with said reset port via a path not including said flow restrictor;

a vent coupled to atmosphere; and first and second anti-tiedown valves each coupled between said vent and said second and first pilot timing chambers, respectively, said anti-tiedown valves being opened in response to said first and second reset pistons being extended, respectively.

4. The control valve system of claim 3 further comprising a reset timing chamber coupled to said second reset piston.

5. The control valve system of claim 3 wherein said first and second anti-tiedown valves each includes a movable sealing surface integrally formed with said first and second reset pistons, respectively.

6. The control valve system of claim 3 further comprising:
first and second crossover chambers communicating with said second and first inlet poppets, respectively, and with said first and second pilot timing chambers, respectively; and
first and second return chambers disposed at the other end of said first and second movable valve units, respectively, wherein said first and second return chambers communicate with said second and first crossover chambers, respectively;
wherein said first and second anti-tiedown valves each includes a movable sealing surface integrally formed with said first and second reset pistons, respectively, and a valve seat integrally formed with said first and second return chambers, respectively.

7. The control valve system of claim 3 further comprising first and second piston return springs for urging said first and second reset pistons away from said first and second movable valve units, respectively, for closing said first and second anti-tiedown valves.

8. The control valve system of claim 7 wherein said first piston return spring provides a spring force greater than said second piston return spring.

9. The control valve system of claim 3 further comprising:
first and second crossover chambers communicating with said second and first inlet poppets, respectively, and with said first and second pilot timing chambers, respectively; and
first and second return chambers disposed at the other end of said first and second movable valve units, respectively, wherein said first and second return chambers communicate with said second and first crossover chambers, respectively;
wherein said first and second reset pistons have each have a first working surface area exposed to said first and second return chambers greater than a second working surface area exposed to said pressurized fluid from said reset port.

10. A method of operating a control valve system wherein said control valve system includes a housing defining an inlet, an outlet and an exhaust, said inlet being adapted to receive pressurized fluid, wherein said control valve system includes a first movable valve unit including a first exhaust poppet and a first inlet poppet, wherein said first movable valve unit is movable to an actuated position, a deactuated position, and an intermediate position, wherein said control valve system includes a second movable valve unit including a second exhaust poppet and a second inlet poppet, wherein said second movable valve unit is movable to an actuated position, a deactuated position, and an intermediate position, wherein said control valve system includes first and second pilot valves disposed at one end of said first and second movable valve units, respectively, that are activated to selectably urge said first and second movable valve units to said respective actuated positions, wherein said control valve system includes first and second pilot timing chambers for storing pressurized fluid to be provided to said first and second pilot valves, respectively, wherein said control valve system includes a reset flow restrictor coupled to said reset port, wherein said control valve system includes first and second reset pistons for being extended to drive said first and second movable valve units to their deactuated positions, respectively, in response to pressurized fluid from said reset port, wherein said second reset piston communicates with said reset port via said flow restrictor, and wherein said first reset piston communicates with said reset port via a path not including said flow restrictor, wherein said control valve system includes a vent coupled to atmosphere, and wherein said control valve system includes first and second anti-tiedown valves each coupled between said vent and said second and first pilot timing chambers, respectively, said anti-tiedown valves being opened in response to said first and second reset pistons being extended, respectively, said method comprising the steps of:

connecting a source of pressurized fluid to said reset port;
actuating said first and second reset pistons in response to said pressurized fluid to reset said first and second movable valve units, respectively;
venting said first and second pilot chambers when said first and second reset pistons are actuated, wherein said venting prevents said first and second movable valve units from moving out of said deactuated positions, respectively;
removing said source of pressurized fluid from said reset port;
retracting said first reset piston so that said second pilot chamber receives pressurized fluid while said first pilot chamber continues to be vented;

retracting said second reset piston after a predetermined delay time following retraction of said first reset piston, said predetermined delay time being sufficient to allow said second pilot chamber to become substantially pressurized; and if said second pilot valve is actuated when said second reset piston is retracted, then said pressurized fluid in said second pilot chamber driving said second movable valve unit out of said deactuated position during a time that pressurized fluid in said first pilot chamber is insufficient to drive said first movable valve unit out of said deactuated position, thereby resulting in a faulted condition of said control valve system.

11. The method of claim 10 wherein said control valve system further includes first and second piston return springs for retracting said first and second reset pistons.

12. The method of claim 10 wherein, if said second pilot valve is not actuated when said second reset piston is retracted, then said first pilot chamber becomes substantially pressurized, thereby completing said resetting of said double valve.

* * * * *